March 24, 1931.  L. ROUANET  1,797,929

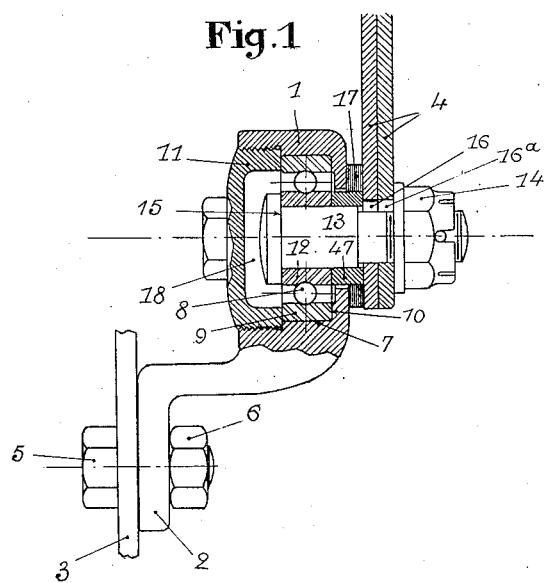

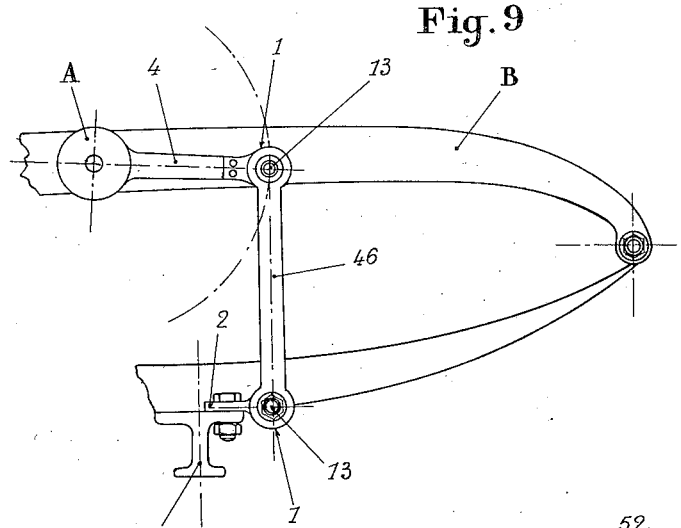
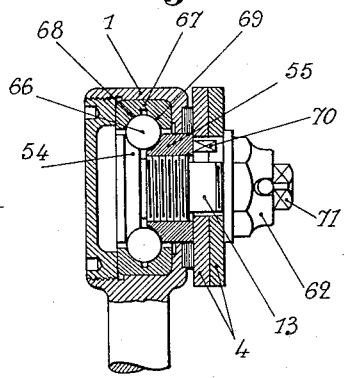
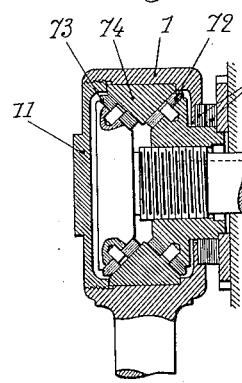
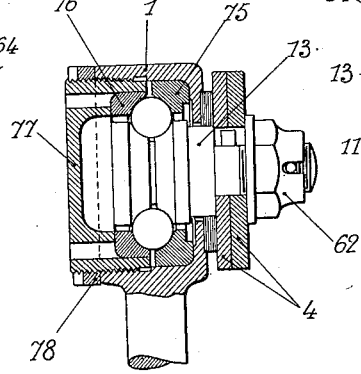
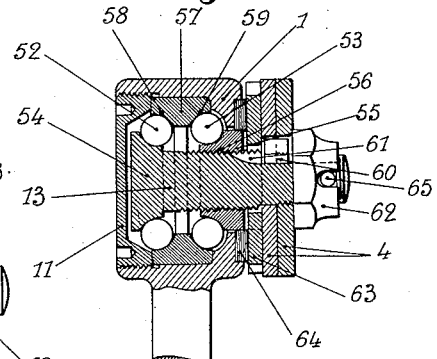
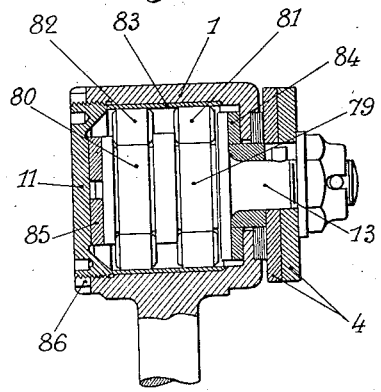

MEANS FOR ATTACHING SHOCK ABSORBERS

Filed Oct. 6, 1924   4 Sheets-Sheet 3

LOUIS ROUANET
INVENTOR:

BY

HIS ATTORNEY.

March 24, 1931. L. ROUANET 1,797,929
MEANS FOR ATTACHING SHOCK ABSORBERS
Filed Oct. 6, 1924   4 Sheets-Sheet 4

LOUIS ROUANET
INVENTOR:
BY Otto Munk
HIS ATTORNEY.

Patented Mar. 24, 1931

1,797,929

UNITED STATES PATENT OFFICE

LOUIS ROUANET, OF IVRY-PORT, FRANCE, ASSIGNOR TO COMPAGNIE D'APPLICATIONS MECANIQUES, OF PARIS, FRANCE

MEANS FOR ATTACHING SHOCK ABSORBERS

Application filed October 6, 1924, Serial No. 741,859, and in France October 22, 1923.

The present invention relates to means for attaching shock absorbers to the parts which are to be connected to each other by said shock absorbers, and more particularly for attaching the arms of the shock absorbers employed upon motor vehicles and termed "friction shock absorbers" i. e. of the type in which two arms operate after the manner of scissors carrying at their adjacent ends friction members adapted to create a resistance for braking the relative displacements which take place between the two connected parts.

The improved means according to the invention afford many advantages, chiefly as concerns wear, upkeep end lubrication, easy construction and lightness, and moreover permit the disassembling and very rapid assembling of the shock absorber, by providing the two parts connected by said shock absorber with journal boxes containing bearings within which journals carried outside the said boxes by the arms of the shock absorber, are rotatably supported. Said bearings may advantageously consist of ball-bearings of a usual type, preferably of a type affording some play, or a ball-joint, in order to provide for the regular working of the shock absorber in spite of the lateral displacement which may take place, in certain cases, between the two parts which are connected by the shock absorber and without causing the arms of the latter to bend in an abnormal manner. The disposition of journals rotatably supported in journal boxes permits of obtaining an absolute fluidtightness; the chambers formed in said boxes may be filled with grease, when they are being put in place, and this eliminates the subsequent upkeep.
Another important feature of the device according to the invention consists in that the journal boxes, which are to be rigidly secured to their supports, comprise brackets, lugs, balls, etc. allowing their initial orientation upon the said supports, which is very advantageous, chiefly in the use of shock absorbers upon motor vehicles, when it is desired to avoid places at which other fixtures are already attached such as radiators, mud guards etc. and when it is necessary to take account of the differences in construction which prevail between the different types of chassis.

According to the invention the journal boxes may also be so constructed that the arms of the shock-absorbers can be mounted upon the said journal boxes, in overhang, or otherwise, with the addition of adjusting means for taking up the wear or the play, and this may be effected either by acting on the journal itself or by acting on the cover of the journal box, or it can be performed automatically by elastic means preferably disposed within the journal box.

In the appended drawings which are given by way of example:

Fig. 1 is a section view of an embodiment of the device according to the invention and rigidly secured to a suitable support.

Figs. 2 to 7 show various devices for connecting the journal box to its support.

Fig. 8 is a diagrammatic elevation showing the attaching device used with a friction shock absorber interposed between the suspended and the non-suspended parts of a motor vehicle.

Fig. 9 is a view similar to Fig. 8 showing the device used with a shock absorber of the type in which the body of the shock absorber is secured to the chassis.

Fig. 10 shows a journal box comprising two sets of balls with oblique contact, wherein the adjustment is effected by acting on the journal, whilst the shock-absorber arm is mounted in overhang.

Fig. 11 is a modification, comprising a single set of balls having four points of contact.

Fig. 12 is another modification, the sets of balls being replaced by continuous rings.

Fig. 13 is a modification of Fig. 11 wherein the adjustment is effected by acting on the cover of the journal box.

Fig. 14 shows an arrangement comprising two sets of rollers, the adjustment being effected by acting on the cover of the box.

Figure 15:
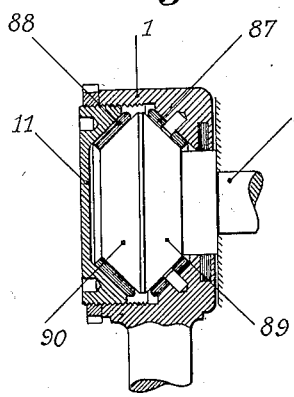
Fig. 15 is a modification of Fig. 13 wherein the set of balls is replaced by two continuous rings.

In the construction shown in Fig. 1, 1 is the journal box provided with a tail-piece or bracket 2 whose section and orientation are suitably chosen during the manufacture in order to allow when attached to the part 3 of the vehicle the desired orientation of the arm 4 of a shock absorber; the fixation is effected as shown in the drawing, by means of a bolt 5 and nut 6, but it is obvious that any other attaching means may be provided during the manufacture of the parts which are to be connected by the shock absorber.

A chamber 7 is cut out in the box 1 in order to receive a ball-bearing 8; the outer ring 9 of said bearing is pressed against the end 10 of the box by means of a tight cover 11. The inner ring 12 of the bearing 8 carries a journal 13 protruding outwardly of the box in order to receive the arm 4 of the shock absorber not shown. The arm 4 is held in the operative position by a nut 14 which also serves to hold the inner ring 12 of the bearing 8 against a shoulder 15 of the journal 13. A stud 16 on the journal 13 is engaged in a groove 16ª in said arm, and by means of which said journal may be rotated by the arm. A washer 17 ensures the fluidtightness of the box at the side on which the shock absorber arm is mounted.

The journal box 1 containing the ball-bearing 8 and the journal 13 being secured to the part 3, and the chamber 18 formed in the box 1 being filled with grease before the outer ring 9 is clamped by the cover 11, in order to mount the shock absorber, the fluid-tight washer 17 is first positioned in order to engage the arm 4 of the absorber upon the outwardly extending end of the journal 3, care being taken that the stud 16 is properly engaged in the groove 16ª. The whole device is pressed together by the nut 14, a distance piece 47 having been disposed beforehand between the absorber arm 4 and the inner ring 12 of the bearing. The stud 16 engaged in the arm 4 prevents the journal 13 from rotating when the nut is screwed up.

The journal box 1 is mounted with its bearing for a practically unlimited time, since it is not necessary to disassemble this part. The grease which is put in during the assembling cannot escape and will hence ensure the perfect lubrication of the bearing, the latter being protected against all outside effects.

In Fig. 2, the box 1 comprises a ball 19 by means of which it can be turned about upon the support 3 not shown, the latter being provided with an arm 20 having a head 21 provided with a spherical seat 22. The final rigid attaching, after the initial orientation of the box 1, is carried out by means of a second head 23 also provided with a spherical recess 24, and of a bolt 25 or like clamping means.

In Fig. 3, a rod 26 carried by the box 1 can be set in a suitable direction in the aperture 27 in a bracket 28 which is secured to the support 3, not shown, before the box 1 is rigidly secured to the bracket by means of the nut 29.

In Figs. 4 and 5, the box 1 comprises an aperture 30 engaging, in the desired direction, upon the rod 31 which is secured to the support 3, not shown.

In Fig. 6, a bracket 32 which is attached to the support 3 (not shown) is provided with a ball head 33 having therein a hole 34 which is bored according to a diameter. The desired direction is given to the box 1 by means of the ball 33, said box having cast integral therewith, or separately secured thereto, a spherical bearing surface 35; the box 1 is then secured to the bracket 32 by means of a nut 36 provided with a spherical seat 37 and screwed upon the end of a rod 38 carried by the box 1 and extending, with sufficient play, within the hole 34 of the ball 33.

In Fig. 7, which shows a device which is particularly suitable for securing the box 1 to a part which is difficult of access, a simple sheet metal member, which may be secured, in any suitable manner to the support 3, not shown, comprises a spherical part 39, obtained by stamping or embossing, by means of which the desired position may be given to the box 1 before the final clamping, which is effected by means of a nut 40 screwing upon a rod 41 secured to the box 1 and loosely movable in a central hole 42 in the spherical part 39 of the sheet metal member. A washer with spherical seat 43 is disposed between the spherical part 39 and the nut 40. Obviously, the seat 44 upon which the box 1 is caused to bear might be convex instead of concave, the bearing surface 45 of the box 1 being designed accordingly.

In Fig. 8, a friction shock absorber A is interposed between the suspended part B and the non-suspended part C of a motor vehicle. The arms 4 of the shock absorber A engage the outwardly extending ends of the journals 13 which are journalled in the box 1. The links 2 are secured to the suspended part B and the non-suspended part C respectively at D and E, and the movement of rotation about these points or axes D and E, which can be imparted to the boxes 1, allows of placing the latter at the proper points in spite of the various parts or accessories such as F which are already secured to the chassis of the vehicle.

In Fig. 9, the end of the arm 4 of a shock absorber A, of the known type in which the body of the shock absorber is secured to the chassis (in the figure this apparatus is secured to the suspended part B of the motor vehicle), carries a box 1 which is rigidly secured thereto. At the end of the journal 13 which is journalled in the said box 1 is mounted a link 46 which may be preferably formed from sheet metal by punching in such manner that it can readily bend under the lateral displacements between the suspended part B and the non-suspended part C of the vehicle; the other end of the link 46 is secured to the journal 13 of a second box 1 the link 2 whereof is rigidly secured to the non-suspended part C.

In Fig. 10, the journal 13 is mounted in a bearing provided with two sets of balls 52 and 53, with oblique contact. The tapered portion 54 upon which roll the balls 52 is integral with the journal 13 upon which is mounted in overhang the double arm 4 of a shock absorber, not shown. The tapered member 55 upon which roll the set of balls 53 is screwed upon a screwthreaded portion 56 of the journal 13. The said journal and the tapered portion 55 extend outwardly of the casing 1 within which is disposed the outer ring 57 of the bearing which comprises also roller races 58, 59 co-operating respectively with the ball sets 52 and 53. The outer ring 57 is maintained within the casing 1 by the cover 11.

A key 60 disposed in a slot 61 in the said journal serves to secure the latter to the shock-absorber arm 4; the latter is held against rotation with reference to the journal, and the tapered member 55 serves as a support for the maintenance of the arm 4, the clamping being performed from the exterior by means of the nut 62. A washer 63 is interposed between the member 55 and the arm 4 to facilitate the adjustment of said member 55, and this may be effected after the arm has been loosened, by slightly unscrewing the nut 62. The fluid-tightness is obtained by means of a packing member 64 placed between the washer 63 and the end wall of the casing.

The said arrangement of the balls and their oblique contact with the said roller races will ensure the normal working of the bearing in spite of the efforts of torsion and flexion of the shock-absorber arm 4. The obliquity of the contact between the said balls and their races can be suitably determined by taking account of the force of the shock absorber, and, due to this obliquity, the play produced by the wear will have but little effect upon the guiding of the shock-absorber; further, the play can be taken up at once by simply screwing the tapered member 55. The outer ring 57 of the ball-bearing may obviously be made in two parts suitably placed together, and said parts may be made of stamped metal.

The said arrangement offers numerous advantages. The box or casing 1 will be always fluidtight; the parts of the ball bearing need not be constructed with any accuracy. The only parts susceptible of wear are the outer ring 57 of the bearing and the conical parts 54 and 55 which may be supplied independently or mounted together with the balls; as an article of manufacture. The bearing can be adjusted with great facility and without interfering with the casing nor the shock absorber, after simply unscrewing the nut 62, and the latter may finally be secured by a pin 65 to the journal 13.

In Fig. 11, the bearing of the journal box 1 is disposed within the said box, the said bearing comprises but a single set of balls 66 of the type having four points of contact with the ball races. The outer ring 67 which can be made in one or more parts, comprises the ball races 68 and 69 which co-operate with the races of the stationary tapered portion 54 of the journal 13 and of the adjusting tapered member 55 which is provided with a stud 70. As in Fig. 10, the journal 13 and the member 55 extend outwardly of the casing 1; the arm 4 and the member 55 are connected together by means of the stud 70.

The journal 13 is revoluble in the arm 4, the arm 4 and the member 55 being clamped by turning the journal 13 from the exterior by means of a suitable wrench which is engaged on the square part 71 provided at the end of the journal 13. When the said journal is turned in a given direction, the cones 54 and 55 are brought together in such manner that the balls 66 are caused to contact on their four bearing points; when this is carried out, the outer nut 62 is crewed down and secured by a pin to the journal 13 in order that the device shall be properly held in adjustment. After a certain wear, the device can be again adjusted in the same manner.

The points of contact of the balls with their races are preferably disposed according to lines situated at right angles, so that the bearing is enabled to withstand the axial and radial stresses as well as the oscillating stresses of the journal due to the deformations of the shock absorber while upon the road. Obviously, the device could be arranged so that the adjustment could be carried out as for the device shown in Fig. 10.

Fig. 12 shows a device having the same features as that shown in Fig. 10, and herein the balls 52 and 53 are replaced by the continuous circular rows 72 and 73 made of any suitable material, and preferably a substance which will withstand both friction and wear; the outer ring 74 of the bearing is preferably made of hard steel. The device is adjusted in the same manner as that shown in Fig. 10, the packing member 64 being provided in order to take up the wear of the sets 72 and 73. The ring 74 is maintained in place within the journal box 1 by means of the cover 11. By reason of the fluidtight construction thus afforded, no dust and grit can enter the device even when operated without lubrication, and when operating in oil or grease, the latter will be properly retained. In the latter case lubricating means may be provided upon the said journal box. The said arrangement offers an advantage from the fact that the wear of the parts is confined to the outer ring 74 and to the friction rings 72 and 73, these parts being of a small cost and being readily replaced.

Fig. 13 shows a modification of the device shown in Fig. 11; herein the outer ring of the ball bearing is made in two parts 75 and 76, the part 75 being disposed within the journal box 1 and the part 76 being disposed within the cover 77. The bearing is adjusted by bringing together the parts 75 and 76, this being effected by screwing the cover 77 within the journal box 1, the device being then maintained by means of the lock-nut 78.

According to the said arrangement, the wear can be taken up without interfering with the nut 62 nor the arm 4 which is mounted in overhang and is secured by a pin to the journal 13, as shown in Fig. 10. The advantages thus obtained are the same as for the device shown in Fig. 11, the construction being however somewhat more complicated as concerns the centering of the parts 75 and 76 of the outer ring of the bearing.

In Fig. 14, the journal 13 is provided with two roller races 79 and 80 co-operating with the respective sets of rollers 81 and 82. The outer roller path may be rectified in the wall of the casing 1, or it may preferably consist of a ring 83 which is inserted within the said casing. The said rollers are suitably supported by the journal 13, whilst the outer roller path consisting of the ring 83 has no guiding means. Due to the space between the rollers 81 and 82 the latter are enabled to operate in a satisfactory manner, and the journal 13 is suitably guided and is enabled to withstand all torsion due to the action of the arm 4 of the shock-absorber.

The journal 13 is guided axially in the casing by means of washers 84 and 85 which are interposed on the one hand between the journal and the end wall of the casing 1 and on the other hand between the end of the journal situated opposite the arm 4 and the end wall of the cover 11; the latter may be secured to the said casing 1 by means of the lock nut 86.

The said arrangement ensures the accurate guiding of the journal, as well as a very considerable resistance to radial stresses and a sufficient resistance to movements of oscillation of the journal working in overhang. In Fig. 15 which is a modification of Fig. 13, the set of balls is replaced by two friction rings 87 and 88 which are respectively secured to the casing and the cover 11. The rings 87 and 88 are in direct friction contact with the journal 13 made of suitable material. The wear is confined to the tapered members 89 and 90 of the said journal and to the rings 87 and 88. The special arrangements for the mounting and the adjustment may be carried out in the same manner as for Fig. 12.

Figure 16:
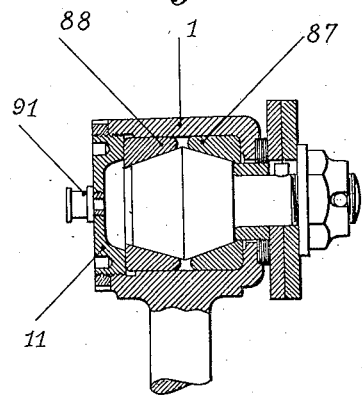
Fig. 16 is a modification of Fig. 15.

In Fig. 16, which is a modification of Fig. 15, the friction members 87 and 88 are both secured to the casing 1. The ring 88 is slidable lengthwise in the said casing in order to provide for the adjustment, which latter is obtained by means of the cover 11. The rings 87 and 88 and the said casing can be secured together by any suitable means, for example by peripheral teeth or grooves. A lubricating plug 91 may be provided upon the cover 11.

Figure 17:
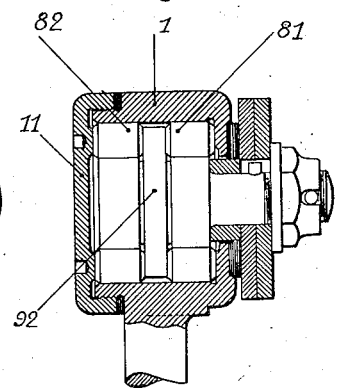
Fig. 17 is a modification of Fig. 14.

In Fig. 17 which is a modification of Fig. 14, a thrust washer 92 is disposed between the two sets of rollers 81 and 82; the set of rollers 81 bears against the end wall of the casing 1, whilst the set of rollers 82 is supported against the inner wall of the cover 11; the two sets of rollers 81 and 82 will thus ensure at the same time the radial and axial guiding.

Figure 18:
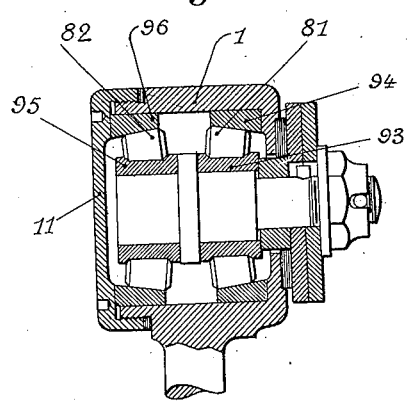
Fig. 18 shows an arrangement comprising a set of tapered rollers, the adjustment being effected by acting on the cover.

In Fig. 18, the rollers 81 and 82 have a tapered shape and are disposed respectively between the races 93, 94 and 95, 96. The outer race 94 for the rollers 81 bears against the end of the casing 1, whilst the outer race 96 for the rollers 82 is slidable lengthwise within the said casing. The wear is taken up by means of the cover 11 which is in contact with the outer lateral wall of the outer race 96.

Figure 19:
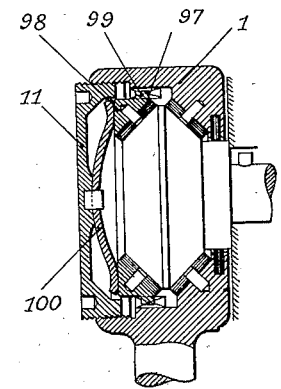
Fig. 19 is a modification of Fig. 15 in which the wear is automatically taken up by means of an elastic device mounted in the cover.

In Fig. 19, which is a modification of Fig. 15, the friction ring 97, is mounted upon a ring 98 secured to the casing 1 and slidable lengthwise therein, by means of the toothed portion 99. Upon the cover 11 is mounted an elastic member 100 (Belleville washer or the like) whose tension can be adjusted by simply screwing the cover 11 into the casing 1. The wear can thus be automatically taken up by means of the member 100. Obviously, an elastic arrangement of this kind may be employed in any of the devices shown in Figs. 10 to 18.

Figure 20:
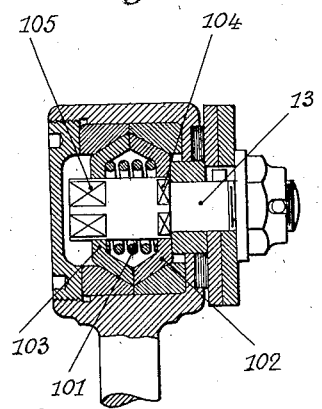
Fig. 20 is a modification of Fig. 16 in which the wear is taken up by an elastic device interposed between the continuous rings.

In Fig. 20, which is a modification of Fig. 16, the wear is taken up automatically by means of the spring 101 urging apart the inner tapered members 102 and 103 which are suitably secured to the journal 13, the latter comprising for this purpose polygonal portions 104 and 105.

Figure 21:
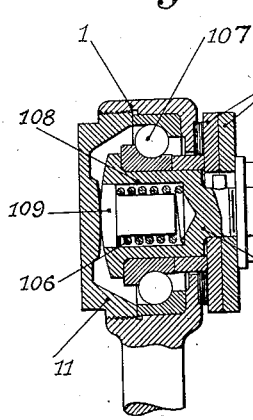
Fig. 21 shows an arrangement comprising a ball-bearing of the radial-axial type and providing for the automatic taking up of the wear.

In Fig. 21, the single bearing is a bearing of the radial-axial type with a single set of balls 106. The necessary guiding and the constant action in the desired direction are ensured by means of a spring 107 which is caused to bear on the one hand upon the inner end of a recess 108 formed in the journal 13, and on the other hand upon the inner face of the cover 11, through the medium of a guiding stud 109; the said arrangement ensures the guiding of the arm 4 of the shock-absorber, not shown, and allows a slight bending in the event of abnormal deflections of the arm 4. The wear is automatically taken up by the spring 107.

Figure 22:
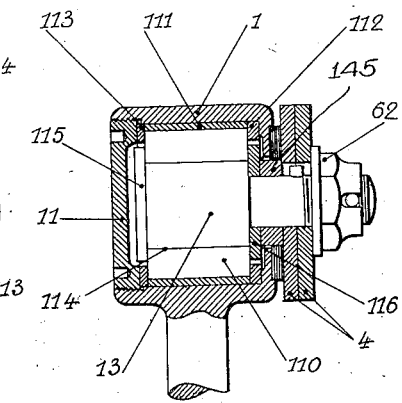
Fig. 22 shows an arrangement comprising a set of rollers, ensuring the proper axial position of the journal.

In Fig. 22 a single set of rollers 110 of great length provides for the axial and the radial guiding. This arrangement is most advantageous by reason of its inexpensive construction; in particular, the work for rectifying the various parts is reduced to a minimum. The outer roller race 111 is preferably brought separately within the said casing, and is maintained between the end wall of the casing and the cover 11 with the interposition of the machined and rectified washers 112 and 113 against which the rollers 110 are caused to bear. The inner roller race 114 is rectified upon the journal itself, but this part might also consist of a separately secured ring. The rollers are held in place upon the inner race 114 by means of an annular flange 115 on the journal 13 and of a machined washer 116. The wear is taken up by means of a nut 62, screwed on the journal and a suitable distance piece 145 is disposed between the washer 116 and the shock absorber arm 4.

Figure 23:
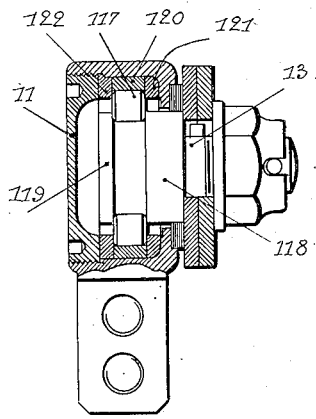
Fig. 23 shows an arrangement comprising a roller bearing and provided with lateral thrust washers.

In Fig. 23, a single set of rollers 117 is guided between the shoulders 118 and 119 of the journal 13; the set of rollers 117 is thus also held on its outer race, and the latter can be made in three parts 120, 121, 122. The adjustment is carried out and the wear taken up by screwing the cover 11.

Figure 24:
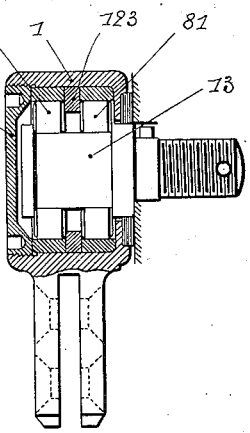
Fig. 24 is a modification of Fig. 14, provided with a thrust washer interposed between two sets of rollers.

In Fig. 24 which is a modification of Fig. 14, the axial guiding and the resistance to oscillations are obtained by placing a thrust washer 123 between the sets of rollers 81 and 82, said washer being held in the interior of the casing 1 by the cover 11. But obviously, the reverse disposition might be employed, the washer 123 being disposed upon the journal 13.

Figure 25:
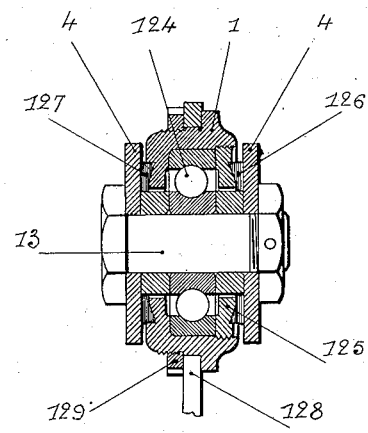
Fig. 25 shows a bearing with one set of balls, in which the overhang can be obviated in mounting the corresponding arm of the shock-absorber.

In Fig. 25, the device differs from all of the preceding devices from the fact that the arm 4 of the shock-absorber, which is herein as in the major part of the known devices made in two parts, is no longer in overhang; the two parts of the arm 4 are mounted on either side of the journal 13 disposed in the casing 1. The outer ring of the ball bearing member 124 is maintained in the said casing by the cover 125, suitable packing members 126 and 127 are disposed at either side of the casing, and the latter may comprise an extension or shank or like portion whereby it may be attached to the corresponding member which is to be connected to another by the shock absorber. The said casing can be employed to advantage in all cases in which the shock-absorber is connected with the vehicle frame by a link, in order to connect the said link with the shock absorber. The link may consist for example of a metal plate 128 secured to the casing 1 and preferably according to the common axis of the casing and of the bearing; the latter may be of any known type: ball joint bearing, with or without play, or comprising one or more sets of balls, rollers or the like. The member 128 is clamped upon the casing by means of a nut 129.

Figure 26:
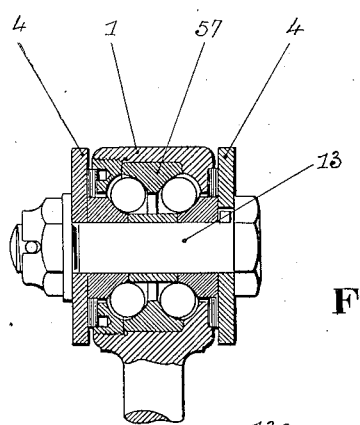
Fig. 26 is a modification of Fig. 25 comprising two sets of balls with oblique contact.

Fig. 26, as Fig. 25, shows an arrangement of the shock-absorber arm 4 upon the journal 13, the same not being in overhang; this arrangement is analogous to that of Fig. 10.

Figure 27:
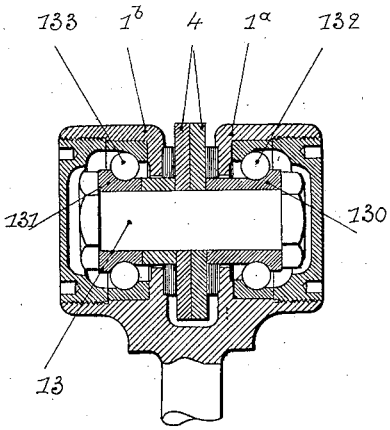
Fig. 27 shows an arrangement comprising a double casing, the bearings being adjusted by acting on the single journal.

In Fig. 27, the journal box is made double and comprises the two parts 1ª and 1ᵇ; the shock-absorber arm 4 is disposed in the middle plane upon the journal 13 upon which are mounted the inner roller races 130 and 131 of the respective ball bearings 132 and 133 of the oblique contact type. The bearings are held and adjusted by means of the journal 13.

Figure 28:
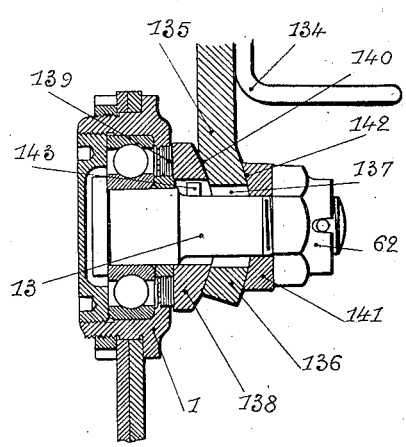
Fig. 28 is a modification of Figs. 25 and 26, showing the method of attaching the device to one of the parts of the vehicle.

In Fig. 28 which shows a modification of Figs. 25 and 26, the journal 13 is secured to the vehicle frame with the interposition of a hemispherical bearing portion. To the part 134 of the vehicle is secured a lug 135 having a hemispherical portion 136 provided at its centre with an aperture 137 for the loose insertion of the journal 13 mounted in the casing 1. A washer 138 having one face 139 plane and the other face 140 convex, with the same curvature as the concave face of the spherical portion 136, is interposed between the lug 135 and the casing 1, whilst a second washer 141 having a hemispherical concave portion 142 is interposed between the other face of the lug 135 and the nut 62. A stud 143 serves to secure the washer 138 to the journal 13; said washer has a lateral polygonal periphery (hexagonal for instance) which permits of holding the device in place when the nut 62 is tightened. The said hemispherical bearing portion provides for the initial orientation of the shock absorber when the latter is mounted upon the vehicle.

Having now described my invention, what I claim as new and desire to secure by Letters Patent is:

1. A device for attaching one arm of a friction shock absorber to a part of a vehicle comprising a hollow connecting box, means for securing said hollow box to the said part of the vehicle, an axle journaled in said hollow box and extending out of said box on one side of said box, means carried by the part of said axle extending out of said hollow box for securing said arm of the friction shock absorber to said axle and means adapted to hold said axle in said box independently of said arm.

2. A device for attaching one arm of a friction shock absorber to a part of a vehicle comprising a hollow connecting box, means for securing said hollow box to the said part of the vehicle, an axle journaled in said hollow box and extending out of said box on one side of said box, means carried by the part of said axle extending out of said hollow box for securing said arm of the friction shock absorber to said axle, a member in said box surrounding said axle and an annular flange on the free end of said axle within said hollow box for holding said axle in said box independently of said arm.

3. A device for attaching one arm of a friction shock absorber to a part of a vehicle comprising a hollow connecting box, means for securing said hollow box to the said part of the vehicle, an axle journaled in said hollow box and extending out of said box on one side of said box, a cover for said box on the other side of said box, means carried by the part of said axle extending out of said hollow box for securing said arm of the friction shock absorber to said axle, a bearing provided around said axle in the inside of said hollow box and an annular flange on said axle between said cover and said bearing for holding said axle in said box independently of said arm.

4. A device for attaching one arm of a friction shock absorber to a part of a vehicle comprising a hollow connecting box, means for securing said hollow box to the said part of the vehicle, and axle journaled in said hollow box and extending out of said box on one side of said box, a cover for said box on the other side of said box, means carried by the part of said axle extending out of said hollow box for securing said arm of the friction shock absorber to said axle, a bearing with rolling members provided around said axle in the inside of said hollow box, and an annular flange on said axle between said cover and said bearing for holding said axle in said box independently of said arm.

5. A device for attaching one arm of a friction shock absorber to a part of a vehicle comprising a hollow connecting box, means for securing said hollow box to the said part of the vehicle, an axle journaled in said hollow box and extending out of said box on one side of said box, means carried by the part of said axle extending out of said hollow box for securing said arm of the friction shock absorber to said axle, means for giving to said hollow box any desired direction and means adapted to hold said axle in said box independently of said arm.

6. A device for attaching one arm of a friction shock absorber to a part of a vehicle comprising a hollow connecting box, means for securing said hollow box to the said part of the vehicle, an axle journaled in said hollow box and extending out of said box on one side of said box, a cover for said box on the other side of said box, means carried by the part of said axle extending out of said hollow box for securing said arm of the friction shock absorber to said axle, a bearing provided around said axle in the inside of said hollow box, said bearing being clamped between the bottom of said hollow connecting box and said cover and an annular flange on said axle between said cover and said bearing for holding said axle in said box independently of said arm.

7. A device for attaching one arm of a friction shock absorber to a part of a vehicle comprising a hollow connecting box, means for securing said hollow box to the said part of the vehicle, an axle journaled in said hollow box and extending out of said box on one side of said box, a hollow cover for said box on the other side of said box, means carried by the part of said axle extending out of said hollow box for securing said arm of the friction shock absorber to said axle, a bearing provided around said axle in the inside of said hollow box, said bearing being clamped between the bottom of said hollow connecting box and said hollow cover, a lubricating substance in the inside of said hollow connecting box and an annular flange on said axle between said cover and said bearing for holding said axle in said box independently of said arm.

8. A device for attaching one arm of a friction shock absorber to a part of a vehicle comprising a hollow connecting box, means for securing said hollow box to the said part of the vehicle, an axle journaled in said hollow box and extending out of said box on one side of said box, a cover for said box on the other side of said box, means carried by the part of said axle extending out of said hollow box for securing said arm of the friction shock absorber to said axle, a bearing with rolling members provided around said axle in the inside of said hollow box, means adapted to take up the wear in said hollow connecting box, and an annular flange on said axle between said cover and said bearing for holding said axle in said box independently of said arm.

9. A device for attaching one arm of a friction shock absorber to a part of a vehicle comprising a hollow connecting box, means for securing said hollow box to the said part of the vehicle, an axle journaled in said hollow box, and extending out of said box on one side of said box, a cover for said box on the other side of said box, means carried by the part of said axle extending out of said hollow box for securing said arm of the friction shock absorber to said axle, an annular flange on that end of said axle which is in the inside of said hollow box, and a roller bearing provided around said axle in the inside of said hollow box and formed with rollers and inner and outer roller races having substantially the same length, said rollers being held against said annular flange and a distance piece which bears on one side against said rollers and on the other side against said arm of said friction shock absorber so that said rollers are not contacting with the bottom of said hollow connecting box and so that said axle is held in said box independently of said arm.

10. A device for attaching one arm of a friction shock absorber to a part of a vehicle comprising a hollow connecting box, means for securing said hollow box to the said part of the vehicle, an axle journaled in said hollow box, and extending out of said box on one side of said box, a cover for said box on the other side of said box, means carried by the part of said axle extending out of said hollow box for securing said arm of the friction shock absorber to said axle, an annular flange on that end of said axle which is in the inside of said hollow box, a roller bearing provided around said axle in the inside of said hollow box and formed with rollers and inner and outer roller races having substantially the same length, said rollers being held against said annular flange, a distance piece which bears on one side against said rollers and on the other side against said arm of said friction shock absorber so that said rollers are not contacting with the bottom of said hollow connecting box and so that said axle is held in said box independently of said arm, and a washer provided on each side of the outer roller race adapted to clamp said race between the bottom of said hollow connecting box and said cover.

11. A device for attaching one arm of a friction shock absorber to a part of a vehicle comprising a hollow connecting box, means for securing said hollow box to the said part of the vehicle, an axle journaled in said hollow box and extending out of said box on one side of said box, a cover for said box on the other side of said box, means carried by the part of said axle extending out of said hollow box for securing said arm of the friction shock absorber to said axle, a roller bearing provided around said axle in the inside of said hollow box and formed with rollers and inner and outer roller races having substantially the same length, an annular flange between said cover and said bearing on that end of said axle which is in the inside of said hollow box, two washers bearing on the inner roller race, one of which bears against said flange of the axle and the other against said arm of said friction shock absorber and two washers bearing on the outer roller race, one of which bears against the bottom of said hollow connecting box and the other against said cover.

In testimony whereof I have signed my name to this specification.

LOUIS ROUANET.